United States Patent
Goetting et al.

(10) Patent No.: US 9,444,375 B2
(45) Date of Patent: Sep. 13, 2016

(54) CONTROL SYSTEM FOR A SYNCHRONOUS MACHINE AND METHOD FOR OPERATING A SYNCHRONOUS MACHINE

(71) Applicant: Robert Bosch GmbH, Stuttgart (DE)

(72) Inventors: Gunther Goetting, Stuttgart (DE); Sebastian Paulus, Esslingen am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/774,860

(22) PCT Filed: Feb. 14, 2014

(86) PCT No.: PCT/EP2014/052931
§ 371 (c)(1),
(2) Date: Sep. 11, 2015

(87) PCT Pub. No.: WO2014/139754
PCT Pub. Date: Sep. 18, 2014

(65) Prior Publication Data
US 2016/0028337 A1    Jan. 28, 2016

(30) Foreign Application Priority Data
Mar. 12, 2013   (DE) .......................... 10 2013 204 194

(51) Int. Cl.
*H02P 21/00* (2016.01)
*H02P 6/14* (2016.01)
*H02P 6/18* (2016.01)

(52) U.S. Cl.
CPC ................. *H02P 6/14* (2013.01); *H02P 6/185* (2013.01)

(58) Field of Classification Search
USPC .................. 318/400.02, 568.19, 700, 400.12
See application file for complete search history.

(56) References Cited

U.S. PATENT DOCUMENTS 6,388,416 B1 * 5/2002 Nakatani ................... H02P 6/20
318/700

(Continued)

FOREIGN PATENT DOCUMENTS

DE    102006046638    6/2007
WO    2009136381    11/2009

OTHER PUBLICATIONS

Arias, et al., "Sensorless Field Oriented Control with Matrix Converters and Surface Mount Permanent Magnet Synchronous Machines," Electronics, Circuits and Systemns, 2008. ICECS 2008. 15th IEE International Conference on, IEEE, Piscataway, NJ, USA, Aug. 31, 2008, pp. 734-737.

(Continued)

*Primary Examiner* — Jorge L Carrasquillo
(74) *Attorney, Agent, or Firm* — Michael Best & Friedrich LLP

(57) ABSTRACT

The invention relates to a method for operating a synchronous machine, comprising the following steps: determining a difference value between the rotor inductance of the synchronous machine in the polar axis direction and the rotor inductance of the synchronous machine in the pole-gap direction for each of a plurality of different 2-tuples from values of useful current adjusted in the rotor-fixed coordinate system of the synchronous machine; preparing a characteristic diagram for the determined difference values in dependence on the 2-tuples of the values of useful current; determining a torque-dependent operating-point trajectory for the 2-tuples of the values of useful current taking into account the magnitude of the determined difference values along the operating-point trajectory to be determined; and operating the synchronous machine according to the determined operating-point trajectory.

5 Claims, 2 Drawing Sheets

(56) References Cited

U.S. PATENT DOCUMENTS

| | | | |
|---|---|---|---|
| 7,161,324 B1* | 1/2007 | Satake | H02P 21/00 318/720 |
| 2007/0229021 A1* | 10/2007 | Yoshida | B62D 5/046 318/807 |
| 2008/0001570 A1* | 1/2008 | Gaetani | H02P 6/08 318/721 |
| 2009/0278485 A1 | 11/2009 | Strothmann | |
| 2011/0199031 A1* | 8/2011 | Balazovic | H02P 23/14 318/400.33 |
| 2012/0235609 A1* | 9/2012 | Ide | H02P 6/183 318/400.02 |

OTHER PUBLICATIONS

Arias, et al., "Angle estimation for Sensorless Field Oriented Control with Matrix Converters and Surface Mount Permanent Magnet Synchronous Machines," Power Electronics Specialists Conference, 2008. PESC 2008. IEEE, IEEE, Piscataway, NJ, USA, Jun. 15, 2008, pp. 3659-3664.

Arias, et al., "Position estimation with voltage pulse test signals for Permanent Magnet Synchronous Machines using Matrix Converters," Compatibility in Power Electronics, 2007. CPE '07, IEEE, PI, May 1, 2007, pp. 1-6.

International Search Report for Application No. PCT/EP2014/052931 dated Sep. 29, 2014 (English Translation, 3 pages).

* cited by examiner

CONTROL SYSTEM FOR A SYNCHRONOUS MACHINE AND METHOD FOR OPERATING A SYNCHRONOUS MACHINE

BACKGROUND OF THE INVENTION

The invention relates to a control system for a synchronous machine and a method for operating a synchronous machine.

When controlling a synchronous machine, for example in an electrical drive system of an electrically operated vehicle, the acquirement of the relative position of the rotor to the stator of the synchronous machine plays a key role. In order for a synchronous machine to provide a required torque, a rotating electrical field is generated in the stator which rotates synchronously with the rotor. The current angle of the rotor for the feedback control is required for the generating of this field.

An option for determining the rotor angle is to feed test voltage signals into one or a plurality of phases of the synchronous machine and to measure the system response by evaluating the phase currents at the neutral point of the synchronous machine in order to draw conclusions therefrom about the current rotor angle.

The WIPO patent publication WO 2009/136381 A2 discloses, for example, a method for determining the rotor angle of a synchronous machine in which measuring periods for measuring voltages at the neutral point are optimized by shifting clock samples of a pulse width modulated phase actuation. An exemplary test signal injection method for three-phase machines is revealed in Linke, M et al.: "Sensorless Speed and Position Control of Synchronous Machines Using Alternating Carrier Injection", Electric Machines and Drives Conference, IEMDC 2003, IEEE. The German patent publication DE 10 2006 046 638 A1 ultimately discloses a further test signal method for determining items of phase position information of a rotor of a synchronous machine.

Many of these sensorless methods are based on entering phase-shifted voltage pulses, which utilize the anisotropy of a synchronous machine in order to obtain an item of rotor position information from the different system responses. Depending on the feed of useful current to the synchronous machine, a decrease in said anisotropy may occur at certain operating points so that the rotor position information can no longer be extracted or at least no longer be extracted with sufficient reliability from the data. In order to expand the application range of sensorless methods, there is therefore the need for solutions with regard to the actuation of a synchronous machine, which can provide better boundary conditions for the reliability and stability of methods for determining rotor angles.

SUMMARY OF THE INVENTION

According to one aspect, the present invention provides a method for operating a synchronous machine, comprising the following steps: determining a difference value between the rotor inductance of the synchronous machine in the polar axis direction and the rotor inductance of the synchronous machine in the pole-gap direction for each of a plurality of different 2-tuples from values of useful current adjusted in the rotor-fixed coordinate system of the synchronous machine; preparing a characteristic diagram for the determined difference values in dependence on the 2-tuples of the values of useful current; determining a torque-dependent operating-point trajectory for the 2-tuples of the values of useful current taking into account the magnitude of the determined difference values along the operating-point trajectory to be determined; and operating the synchronous machine according to the determined operating-point trajectory.

According to a further aspect, the present invention provides a control system for a synchronous machine, comprising a closed-loop control device which is designed to carry out a field-oriented control for the synchronous machine and comprising an open-loop control device which is designed to determine an operating-point trajectory for the field-oriented closed-loop control of the closed-loop control device according to the inventive method.

A concept of the present invention is to expand the application range of sensorless methods for determining the rotor angle for synchronous machines, in particular at low rotational speeds. The invention is based on the recognition that the amplitude of system responses generated and determined on the basis of a sensorless method for determining rotor angle can be increased and as a result the reliability and accuracy of the method for determining rotor angle can be improved by means of an adaptation of the operating-point trajectory of a synchronous machine. To this end, the operating-point trajectory of the synchronous machine is adjusted in such a manner that the difference between the d- and q-inductance of the synchronous machine in the rotor-fixed coordinate system is as high as possible. The determination of the operating-point trajectory of the synchronous machine takes place on the basis of a characteristic diagram which is to be determined in advance and concerns all possible 2-tuples of values of useful current in the rotor-fixed coordinate system, in which the amplitudes of the system responses are plotted as contour lines. On the basis of finding a balance between the efficiency of the synchronous machine and a difference between the d- and q-inductance of the synchronous machine which is as high as possible, the operating-point trajectory can be determined as a compromise between the accuracy of the rotor angle determination and the efficiency of the machine operation.

A significant advantage of proceeding in this manner is that the operating range of the method for determining the rotor angle for the synchronous machine can be expanded. For example, the saturation of the synchronous machine resulting from the feed of useful current can be correspondingly lowered in the range of higher torques, whereby the significance of the rotor position information is increased.

According to one embodiment of the method according to the invention, the determining in each case of a difference value between the rotor inductance of the synchronous machine in the polar axis and the rotor inductance of the synchronous machine in the pole-gap direction can comprise the steps of: generating a plurality of test voltage pulses having an operating frequency, entering of the plurality of test voltage pulses comprising respectively different phase offsets to the rotor position of the rotor of the synchronous machine, said phase offsets being distributed over a complete rotor revolution of the rotor of the synchronous machine, measuring the phase currents of the synchronous machine as a system response to the plurality of the test voltage pulses that have been supplied, determining the amplitude of the phase current profile of the measured phase currents as a function of the adjusted phase offsets for determining the difference value and iterating the steps of generating, entering, measuring and determining for each of a plurality of different 2-tuples from values of useful current adjusted in the rotor-fixed coordinate system of the synchronous machine. Many methods for determining rotor angle are based directly on entering test signals into the rotor of the synchronous machine. In particular, the method according to the invention is very well suited to these methods.

According to a further embodiment of the method according to the invention, the determining of the operating-point trajectory can take place while taking into account the level of efficiency of the synchronous machine. This facilitates finding a balance between an efficient operation of the synchronous machine and an improvement in the accuracy of the method for determining the rotor angle.

According to a further embodiment of the method according to the invention, the determining of the operating-point trajectory can take place in such a manner that the determined difference values along the operating-point trajectory are as high as possible and that the level of efficiency of the synchronous machine along the operating-point trajectory does not drop below a predeterminable threshold value. As a result, the operating-point trajectory can be optimized in a boundary value problem as simply as possible.

According to a further embodiment of the method according to the invention, the determining of the operating-point trajectory can take place in such a manner that the overall amplitude of the values of useful current is as high as possible along the operating-point trajectory.

According to one embodiment of the control system according to the invention, the control system can furthermore comprise a synchronous machine, which is designed to be operated by the closed-loop control device according to the determined operating-point trajectory of the open-loop control device.

BRIEF DESCRIPTION OF THE DRAWINGS

Further features and advantages of embodiments of the invention ensue from the description below with reference to the attached drawings.

In the drawings.

DETAILED DESCRIPTION

Identical reference signs generally denote similar or similarly functioning components. The schematic signal and parameter profiles shown in the figures of the drawings are only of an exemplary nature, which for reasons of clarity are configured in an idealized fashion. It goes without saying that signal and parameter profiles that deviate therefrom can result in practice due to deviating boundary conditions and that the depicted signal and parameter profiles are used only to illustrate principles and functional aspects of the present invention.

Synchronous machines in terms of the present invention are electrical machines, in which a constantly magnetized rotor is driven synchronously by a time-dependent rotating magnetic field in the encompassing field magnet or stator as a result of magnetic interaction; thus enabling the rotor to carry out a movement synchronous to the voltage ratios in the stator. This means that the rotational speed via the number of pole pairs is dependent on the frequency of the stator voltage. Synchronous machines in terms of the present invention can, for example, be three-phase synchronous machines, which, for example, are designed as external pole or internal pole machines which comprise a rotor and a stator. Synchronous machines in terms of the present invention can furthermore comprise salient pole machines or non-salient pole machines. Non-salient pole machines have an inductance of the rotor which is independent of axis; whereas salient pole machines have an excellent polar axis, also referred to as d-axis, in the direction of which the main inductance is greater than in the direction of the pole gap, also referred to as q-axis, due to the smaller air gap. In principle, the subsequently mentioned methods and control systems can be used equally for non-salient pole machines and salient pole machines unless reference is explicitly made below to handling the two types of synchronous machines in different ways.

Figure 1:
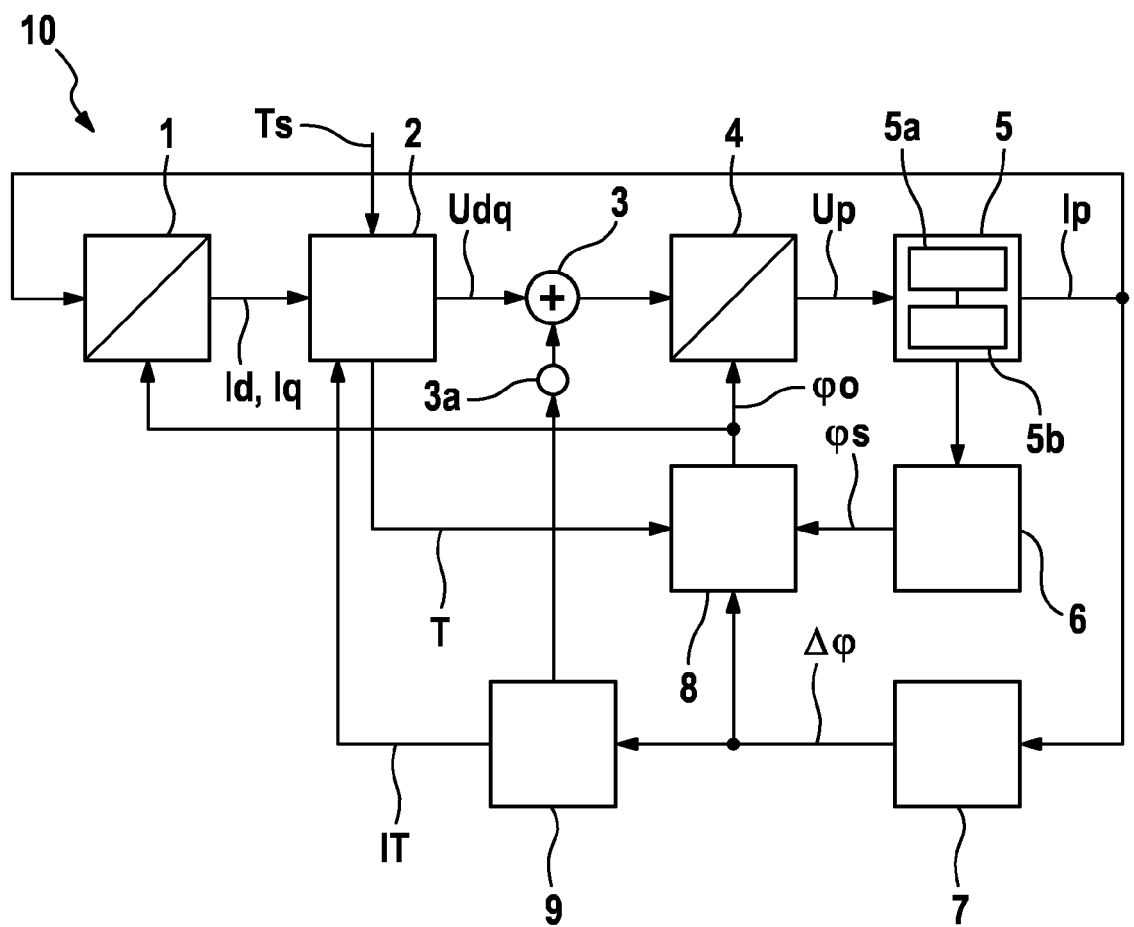
FIG. 1 shows a schematic depiction of a control system for a synchronous machine according to one embodiment of the present invention.

FIG. 1 shows a schematic depiction of a control system 10 for an electrical drive unit 5 comprising an inverter 5a which feeds a synchronous machine 5b with three-phase current.

The synchronous machine 5b can, for example, be a three-phase synchronous machine. In principle, it is however also possible for provision to be made for another number of phases for the synchronous machine. In so doing, the control of the synchronous machine 5b in the electrical drive unit 5 plays a key role. In order for a synchronous machine 5b to provide a required torque, a rotating electrical field, which rotates synchronously with the rotor, is generated in the stator of the machine. In order to generate this field, the current angle of the rotor is required for the control.

The control system 10 therefore comprises a closed-loop control device 2 which carries out a field-oriented control of the synchronous machine 5b or, respectively, the inverter 5a of the drive unit in the rotor-fixed d-, q-coordinate system. To this end, the closed-loop control device 2 is fed with a target torque Ts and accesses the current values of useful current Iq, Id in the rotor-fixed d-, q-coordinate system, which are provided by a first transformation device 1. The first transformation device 1 thus measures the phase currents Ip of the synchronous machine 5b and transforms the phase currents Ip into the values of useful current Iq, Id.

The closed-loop control device 2 transmits actuation voltages Udq in the rotor-fixed d-, q-coordinate system of the synchronous machine 5b to a second transformation device 4ab which performs a corresponding transformation of the actuation voltages Udq into phase actuation voltages for the synchronous machine 5b. The first transformation device 1 as well as the second transformation device 4 accesses the time-dependent rotor angle φo of the rotor of the synchronous machine 5b in relation to the stator of the synchronous machine 5b for the purpose of transformation. This rotor angle φo is generated by an observer 8 which in turn can access a determined rotor angle φs of a position sensor 6 and/or a rotor angle difference Δφ, which is determined by means of an angle estimation algorithm as a function of measured system responses of the synchronous machine 5b.

The position sensor 6 can, for example, detect electrical operating parameters of the synchronous machine 5b, for example by detecting the voltage at the neutral point of the synchronous machine 5b. The observer 8 can, for example, comprise a Kalman filter, a Luenberger observer, a Hautus observer or a Gilbert observer for supporting and verifying the plausibility of the angle observation φo.

An adder 3, with the aid of which test voltage pulses $u_d$, $u_q$ of a particular operating frequency co, can be modulated onto the actuation voltages Udq, is provided between the closed-loop control device 2 and the second transformation device 4 in order to feed the angle estimation algorithm 7. Said test voltage pulses $u_d$, $u_q$ can be fed in by an open-loop control device 9 at the input connection 3a, said control device being able to receive the observed angle difference of the angle estimation algorithm 7.

The control system 10 is however also suitable for any other type of sensorless method for determining rotor angle. That means that other methods can be used as an alternative to feeding in test voltage pulses $u_d$, $u_q$ in order to enable system responses to be measured. For example, system responses to the determination of rotor angle can be used by means of measurements of voltages at the neutral point at suitable points in time in a pulse width modulated phase actuation. It may also be possible, to use test signal methods for determining rotor angle, wherein test signals of a high operating frequency are modulated onto the actuation signal. Generally, every sensorless method for determining rotor angle, which is based on a difference between rotor inductance $L_d$ in the polar axis direction and the rotor inductance $L_q$ in the pole-gap direction of the synchronous machine 5b, is suitable for feeding the angle estimation algorithm 7 for the evaluation of the angle difference.

The system response of the synchronous machine 5b depends inter alia on the useful current feed, the value of which influences the difference between the rotor inductance $L_d$ in the polar axis direction and the rotor inductance $L_q$ in the pole-gap direction. The longitudinal currents $I_d$ and transverse currents $I_q$ of a permanently excited synchronous machine behave dependently on the rotor inductance $L_d$ in the polar axis direction and the rotor inductance $L_q$ in the pole-gap direction and on the applied voltage $U_d$ or, respectively, $U_q$ as follows:

$$dI_d/dt = L_d^{-1} \cdot U_d - R \cdot L_d^{-1} \cdot I_d + L_q \cdot L_d^{-1} \cdot \omega_e \cdot I_q$$

$$dI_q/dt = L_q^{-1} \cdot U_q - R \cdot L_q^{-1} \cdot I_q + L_d \cdot L_q^{-1} \cdot \omega_e \cdot I_d - L_q^{-1} \cdot u_p$$

This applies at the angular speed $\omega_e$ of the rotor of the synchronous machine 5b, the ohmic resistance R and the polar wheel voltage $u_p$. It is furthermore assumed that the pole shoe(s) is/are not operated in saturation. That means that the relationship between current and magnetic flux is linear and the respective inductance is not dependent on the current strength.

If a large amount of useful current is passed through the synchronous machine 5b, a progressive saturation of the rotor core of the synchronous machine can however occur so that the relationship between current and magnetic flux becomes nonlinear. In particular, the difference between rotor inductance $L_d$ in the polar axis direction and the rotor inductance $L_q$ in the pole-gap direction may disappear in certain 2-tuples of the useful current feed Id, Iq. Sensorless methods for determining rotor angle which are dependent on this inductance difference in order to obtain meaningful measured values may lose relevance at such operating points.

An exemplary method of such methods for determining rotor angle will be illustrated below. In order to determine the angle error $\Delta\phi$, the following test signal $[u_d, u_q]$ is applied to the synchronous machine 5b:

$$[u_d, u_q] = u_c \cdot \cos(\omega_c t) \cdot [\cos(\Delta\phi), \sin(\Delta\phi)]$$

Because the electrical behavior of the synchronous machine 5b for high frequencies can be described as a purely inductive load, the following current vector $[i_d, i_q]$ results as the system response to the test signal $[u_d, u_q]$:

$$[i_d, i_q] = (u_c/w_c) \cdot \sin(\omega_c t) \cdot [\cos(\Delta\phi)/L_d, \sin(\Delta\phi)/L_q]$$

In order to extract an item of angle information from these currents per signal processing, the correlation between the measured phase currents in the stator-fixed coordinate system of the synchronous machine 5b and the currents in the rotor-fixed coordinate system is required. In dependence on the estimated d-direction of the synchronous machine, the following equation results for the currents in the rotor-fixed coordinate system:

$$[i_d, i_q] = u_c/(4\omega_c L_q L_d) \cdot [(L_q - L_d)(\sin(\omega_c t - 2\Delta\phi) + \sin(\omega_c t + 2\Delta\phi)) + 2(L_q + L_d)(\sin(2\omega_c t), (L_q - L_d)(\sin(\omega_c t - 2\Delta\phi) + \sin(\omega_c t + 2\Delta\phi)) + 2(L_q + L_d)(\sin(2\omega_c t))]$$

In order to extract the desired terms comprising the item of angle difference information $\Delta\phi$ from the values of the currents $[i_d, i_q]$ in the rotor-fixed coordinate system, that term can be obtained which contains the item of angle difference information $\Delta\phi$ after a high pass filtering, a convolution with the operating frequency $\omega_c$ and a subsequent low pass filtering:

$$[i_d, i_q] = u_c/(4\omega_c L_q L_d) \cdot [(L_q - L_d)(\sin(2\Delta\phi)), (L_q - L_d)(\cos(2\Delta\phi) + (L_q + L_d)]$$

As can easily be seen, the significance of the measured phase currents with regard to the item of angle difference information $\Delta\phi$ depends on the difference of the inductances $L_q$ and $L_d$ the smaller the difference, the more imprecise the determination of the angle difference $\Delta\phi$.

In order to counteract this phenomenon, it is advantageous to select the operating points of the synchronous machine 5b, wherever possible, such that the difference in the inductances $L_q$ and $L_d$ remains as large as possible, i.e. such that the synchronous machine 5b is not operated, even at high torques, in saturation to the greatest possible extent.

Figure 2:
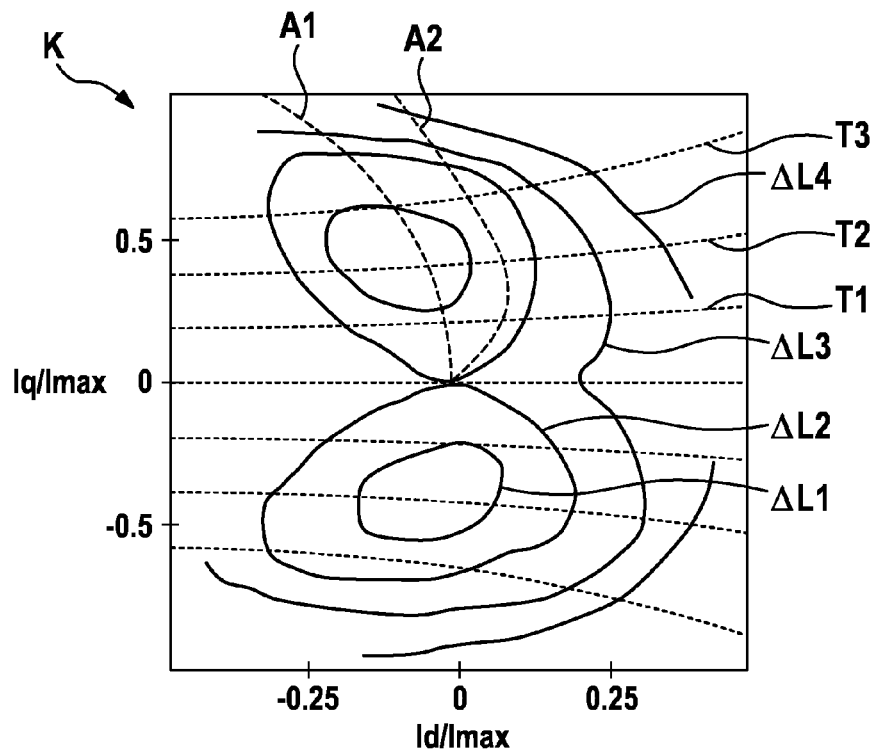
FIG. 2 shows a schematic characteristic diagram for the dependence of the inductance difference between q- and d-inductance of a synchronous machine on the values of useful current according to a further embodiment of the present invention.

FIG. 2 shows a schematic depiction of a characteristic diagram K for the dependence of the inductance difference between the q- and d-inductance of a synchronous machine on the values of useful current Iq and Id.

In order to adjust the operating point of the synchronous machine 5b, the open-loop control device 9 in FIG. 1 can, for example, generate a plurality of test voltage pulses, modulate said test voltage pulses comprising in each case different phase offsets to the rotor position of the rotor of the synchronous machine 5b, which are distributed over a full rotor revolution of the rotor of the synchronous machine 5b, onto the actuation voltages Udq, measure the phase currents Ip of the synchronous machine 5b as a system response to the plurality of fed test voltage pulses with the aid of the angle estimation logarithm 7 and determine the amplitude of the phase current profile of the measured phase currents Ip as a function of the adjusted phase offsets.

These steps are each iterated by the open-loop control device 9 for a plurality of different 2-tuples from values of useful current Id and Iq adjusted in the rotor-fixed coordinate system of the synchronous machine 5b. The characteristic diagram K is then generated by means of the two dimensional plotting of the 2-tuples of the values of useful current Id and Iq. In FIG. 2, a normalization is carried out by way of example to the overall amplitude of the useful current feed, wherein a normalization, however, does not have to necessarily be carried out.

In this characteristic diagram K, the determined amplitudes of the system responses, i.e. the differences in the inductances $L_q$ and $L_d$, can then be depicted, for example as isohypses $\Delta L1$, $\Delta L2$, $\Delta L3$ and $\Delta L4$. For example, the isohypse ΔL1 shows a small inductance difference and the isohypses ΔL2 to ΔL4 show in each case continually increasing inductance differences.

The isohypses ΔL1, ΔL2, ΔL3 and ΔL4 can generally be generated with any arbitrary sensorless method for determining rotor angle, in which respectively one difference value between the rotor inductance $L_d$ of the synchronous machine 5b in the polar axis direction and the rotor inductance $L_q$ of the synchronous machine 5b in the pole-gap direction is determined for a plurality of different 2-tuples from values of useful current adjusted in the d-, q-coordinate system of the synchronous machine 5b. These difference values are used as the basis for plotting the isohypses ΔL1, ΔL2, ΔL3 and ΔL4 in the characteristic diagram K.

Different sub-combinations can be selected from 2-tuples of the values of useful current Id and Iq for respective predefined torques, as is indicated by the respective dotted lines T1, T2 and T3. An operating-point trajectory A1, which is determined according to the MTPA method ("maximum torque per ampere"), is usually provided for the torque-dependent operating points. The optimal level of efficiency of the synchronous machine 5b can be achieved along this operating-point trajectory A1.

As, however, can be seen from the profile of the operating-point trajectory A1, said operating-point trajectory extends to a large extent through operating-point regions having a small inductance difference, for example within the region denoted with ΔL1. In order to now improve the reliability and significance of methods for determining rotor angle which are based on said inductance difference, another torque-dependent operating-point trajectory A2 for the 2-tuples of the values of useful current Id and Iq can be determined which takes the magnitude of the determined amplitudes into account. In so doing, a certain trade-off between the level of efficiency of the synchronous machine 5b and a sufficiently higher inductance difference has to be accepted.

The operating-point trajectory A2 can, for example, take place while simultaneously taking the level of efficiency of the synchronous machine 5b into account so that the determined difference values along the operating-point trajectory A2 are as small as possible and the level of efficiency of the synchronous machine 5b along the operating-point trajectory A2 does not fall below a predeterminable threshold value. Care can furthermore be taken that the overall amplitude of the values of useful current Id and Iq is as high as possible along the operating-point trajectory A2. The operating-point trajectory A2 is only of an exemplary nature in FIG. 2 and it is clear that many other operating-point trajectories can likewise be selected, depending on the requirements of the control system of the synchronous machine 5b. The isohypse ΔL2 can, for example, be traced in the characteristic diagram K using the operating point.

Figure 3:
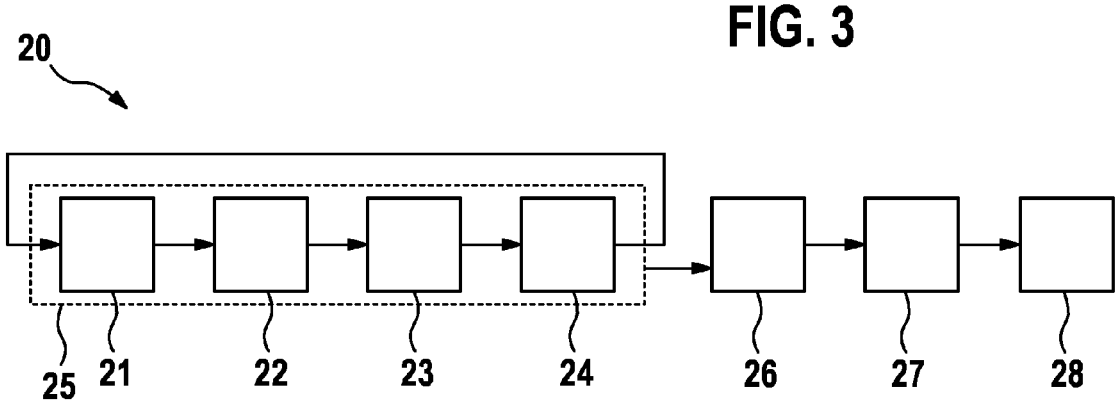
FIG. 3 shows a schematic depiction of a method for adjusting the operating point of a synchronous machine according to a further embodiment of the present invention.

FIG. 3 shows a schematic depiction of a method 20 for adjusting the operating point of a synchronous machine, in particular a synchronous machine 5b as depicted by way of example FIG. 1. The method 20 can thereby access the correlations explained in connection with FIGS. 1 and 2.

A determining of a difference value between the rotor inductance $L_d$ of the synchronous machine in the polar axis direction and the rotor inductance $L_q$ of the synchronous machine in the pole-gap direction for each of a plurality of different 2-tuples from values of useful current adjusted in the rotor-fixed coordinate system of the synchronous machine occurs initially in a step 25 that is denoted generally with the reference sign 25.

This can, for example, be achieved by virtue of the fact that a generating of a plurality of test voltage pulses having an operating frequency occurs in a first step 21. In step 22, an entering of the plurality of test voltage pulses comprising in each case different phase offsets to the rotor position of the rotor of the synchronous machine that are distributed over a complete rotor revolution of the rotor can then take place. Subsequently in step 23, a measuring of the phase currents of the synchronous machine as a system response to the plurality of entered test voltage pulses can take place. Finally, the amplitude of the phase current profile of the measured phase currents can be determined as a function of the adjusted phase offsets in step 24.

The steps 21 to 24 can then be iterated in each case for a plurality of different 2-tuples from values of useful current adjusted in the rotor-fixed d-, q-coordinate system of the synchronous machine.

Independently of how the difference values between the rotor inductance $L_d$ of the synchronous machine in the polar axis direction and the rotor inductance $L_q$ of the synchronous machine in the pole-gap direction are determined in step 25, a characteristic diagram K for the determined difference values in dependence on the 2-tuples of the values of useful current is determined in step 26. Subsequently in step 27, a determining of a torque-dependent operating-point trajectory for the 2-tuples of the values of useful current taking into account the magnitude of the determined amplitudes along the operating-point trajectory to be determined can take place. Said determined torque-dependent operating-point trajectory can then be used in step 28 to actuate the synchronous machine.

The invention claimed is:

1. A method for operating a synchronous machine, comprising the following steps:
   determining a difference value between the rotor inductance of the synchronous machine in the polar axis direction and the rotor inductance of the synchronous machine in the pole-gap direction for each of a plurality of different 2-tuples from values of useful current adjusted in the rotor-fixed coordinate system of the synchronous machine including the steps of:
      generating a plurality of test voltage pulses having an operating frequency,
      entering the plurality of test voltage pulses comprising in each case different phase offsets to the rotor position of the rotor of the synchronous machine that are distributed over a complete rotor revolution of the rotor of the synchronous machine,
      measuring the phase currents of the synchronous machine as a system response to the plurality of the entered test voltage pulses,
      determining the amplitude of the phase current profile of the measured phase currents as a function of the adjusted phase offsets for determining the difference value, and
      iterating the steps of generating, entering, measuring and determining for each of a plurality of different 2-tuples from values of useful current adjusted in the rotor-fixed coordinate system of the synchronous machine;
   preparing a characteristic diagram for the determined difference values in dependence on the 2-tuples of the values of useful current;
   determining a torque-dependent operating-point trajectory for the 2-tuples of the values of useful current taking into account the magnitude of the determined difference values along the operating-point trajectory to be determined; and operating the synchronous machine according to the determined operating trajectory.

2. The method according to claim 1, wherein the determining of the operating-point trajectory takes place such that the overall amplitude of the values of useful current along the operating-point trajectory is increased.

3. A method for operating a synchronous machine, comprising the following steps:

determining a difference value between the rotor inductance of the synchronous machine in the polar axis direction and the rotor inductance of the synchronous machine in the pole-gap direction for each of a plurality of different 2-tuples from values of useful current adjusted in the rotor-fixed coordinate system of the synchronous machine;

preparing a characteristic diagram for the determined difference values in dependence on the 2-tuples of the values of useful current;

determining a torque-dependent operating-point trajectory for the 2-tuples of the values of useful current taking into account the magnitude of the determined difference values along the operating-point trajectory to be determined while simultaneously taking the level of efficiency of the synchronous machine into account; and operating the synchronous machine according to the determined operating trajectory, wherein the determining of the operating-point trajectory takes place such that the determined difference values along the operating-point trajectory are increased and the level of efficiency of the synchronous machine along the operating-point trajectory does not fall below a predetermined threshold value.

4. A control system for a synchronous machine, comprising:

a closed-loop control device which is designed to carry out a field-oriented control for the synchronous machine; and an open-loop control device which is designed to determine an operating-point trajectory for the field-oriented control of the closed-loop control device by determining a difference value between the rotor inductance of the synchronous machine in the polar axis direction and the rotor inductance of the synchronous machine in the pole-gap direction for each of a plurality of different 2-tuples from values of useful current adjusted in the rotor-fixed coordinate system of the synchronous machine;

preparing a characteristic diagram for the determined difference values in dependence on the 2-tuples of the values of useful current;

determining a torque-dependent operating-point trajectory for the 2-tuples of the values of useful current taking into account the magnitude of the determined difference values along the operating-point trajectory to be determined; and operating the synchronous machine according to the determined operating trajectory, wherein the open-loop control device is configured for the determining in each case of a difference value between the rotor inductance of the synchronous machine in the polar axis direction and the rotor inductance of the synchronous machine in the pole-gap direction by generating a plurality of test voltage pulses having an operating frequency;

entering the plurality of test voltage pulses comprising in each case different phase offsets to the rotor position of the rotor of the synchronous machine that are distributed over a complete rotor revolution of the rotor of the synchronous machine;

measuring the phase currents of the synchronous machine as a system response to the plurality of the entered test voltage pulses:

determining the amplitude of the phase current profile of the measured phase currents as a function of the adjusted phase offsets for determining the difference value; and iterating the steps of generating, entering, measuring and determining for each of a plurality of different 2-tuples from values of useful current adjusted in the rotor-fixed coordinate system of the synchronous machine.

5. The control system according to claim 4, wherein the synchronous machine is designed to be operated by the closed-loop control device according to the determined operating-point trajectory of the open-loop control device.

* * * * *